United States Patent [19]

Johnson et al.

[11] 4,104,653
[45] Aug. 1, 1978

[54] SCANNING SHUTTER BLADE ARRANGEMENT WITH AMBIENT AND FLASH RANGES

[75] Inventors: Bruce K. Johnson, Andover; George D. Whiteside, Lexington, both of Mass.

[73] Assignee: Polaroid Corporation, Cambridge, Mass.

[21] Appl. No.: 801,477

[22] Filed: May 31, 1977

[51] Int. Cl.² .............................................. G03B 7/14
[52] U.S. Cl. ...................................... 354/27; 354/29; 354/59; 354/230
[58] Field of Search ...................... 354/59, 29, 26, 196, 354/230, 27

[56] References Cited

U.S. PATENT DOCUMENTS 3,318,215  5/1967  Schiks .................................. 354/139
3,750,543  8/1973  Eloranta et al. ......................... 354/27

Primary Examiner—John Gonzales
Attorney, Agent, or Firm—Edward S. Roman

[57] ABSTRACT

An exposure control for a camera of the type having scanning type shutter blade elements driven by a walking beam to provide a progressive variation in effective exposure and light sensing apertures. A control is provided so that in an artificial scene lighted mode, during an exposure cycle, the scanning blades cause the effective exposure aperture to progressively increase toward the full open f/stop for the camera. In addition, the scanning blades cause the effective photocell aperture to increase at a relatively low rate until a time when the effective exposure aperture equals a predetermined f/stop somewhat below the full open f/stop. The source of artificial illumination is then fired and the effective photocell aperture increases at a relatively high rate to specifically control the artificially illuminated portion of the exposure cycle. In a natural or ambient scene lighted mode, the control provides for the scanning shutter blades to cause both the effective exposure aperture and the effective photocell aperture to progressively increase to predetermined aperture sizes less than the maximum aperture sizes of the artificial scene lighted mode.

17 Claims, 10 Drawing Figures

SCANNING SHUTTER BLADE ARRANGEMENT WITH AMBIENT AND FLASH RANGES

REFERENCE TO RELATED PATENTS

The present application is related to U.S. Pat. No. 3,942,183, issued Mar. 2, 1976 to George D. Whiteside, U.S. Pat. No. 3,972,057, issued July 27, 1976 to George D. Whiteside, and U.S. Pat. No. 3,972,058, issued July 27, 1976 to Bruce K. Johnson and George D. Whiteside, all assigned to the assignee of the present invention. Those patents are incorporated herein by reference.

BACKGROUND OF THE INVENTION

This invention relates to an exposure control system for a photographic apparatus, and more particularly, to an improved exposure control system for a fixed focus photographic apparatus of the type having scanning type shutter blades for respectively blocking and unblocking the passage of light through an exposure opening to a film plane and through a photocell opening to a light sensing photocell.

In U.S. Pat. No. 3,942,183, an exposure control system is disclosed for a camera with a housing surrounding a central casting. The housing supports an objective lens assembly in a manner overlying as exposure opening in the casting, providing an optical path through the lens assembly and the exposure opening to an exposure chamber within the camera. The housing and central casting further include overlying sensor openings which in turn overlie a light sensor assembly. The exposure control system includes at least one shutter blade disposed between the housing and casting and having an exposure aperture and a control aperture. The shutter blades are adapted for pivotal and translational motion in response to rotational displacement of a rotatable blade drive member, or walking beam. At the commencement of an exposure cycle, the walking beam is driven from a first limit towards a second limit in response to a bias means. As the walking beam is displaced between its first and second limits, the exposure and control apertures of the shutter blades cooperate to establish a common overlap with the respective exposure and sensor openings, with the percentage of overlap progressively increasing as the walking beam is displaced towards the second limit. In accordance with the disclosure of this referenced patent, an integration network may be coupled to the sensor to identify a point in time when the integral of the light incident upon the sensor has reached a predetermined limit, whereupon the walking beam is returned to its first limit where the exposure and control apertures are non-overlapping with respect to the exposure opening and sensor respectively, thereby blocking the optical path through the exposure opening and terminating the exposure cycle.

The dislcosure of U.S. Pat. No. 3,972,058 is directed to an exposure system having at least one shutter blade driven by a walking beam in a manner similar to the configuration disclosed in U.S. Pat. No. 3,942,183, and wherein further the exposure system is adapted to provide a follow-focus capability for use in conjunction with an artificial light source. As disclosed, with the follow-focus arrangement, the aperture adjustment is coupled to the range finding or focusing system of the camera. The insertion of an artificial light source into a receptacle in the camera housing introduces a stop member in the path of the walking beam in a manner to limit the travel of the walking beam to a third limit point lying between the nominal first and second limits, with the particular third limit point being dependent upon the operator-contolled focus of the camera. This configuration establishes an artificial light mode wherein the disclosed exposure control system is responsive to the insertion of an artificial light source into a receptacle in the camera housing, and to the operator-controlled focus adjustment, to provide a limitation on the maximum effective aperture for the lens and for the sensor. In this mode of operation, the effective lens and sensor apertures progressively increase as the walking beam rotates from the first limit toward the third limit. Upon reaching the third limit, the effective lens and sensor apertures remain constant for the duration of the exposure cycle. While operating in the natural light mode, i.e. without an inserted artificial light source, the walking beam is not affected by the stop member.

While the cameras of the prior art, as exemplified by the above-noted referenced patents, provide effective exposure control systems, those systems are adapted primarily to variable focus cameras and are dependent upon the particular focus condition.

It is an object of the present invention to provide an exposure control system primarily for a fixed focus photographic apparatus.

It is a further object to provide an exposure control system primarily for a fixed focus photographic apparatus characterized by a relatively simple mechanization.

It is another object of the present invention to provide an exposure control system primarily for a fixed focus photographic apparatus having a natural light mode and an artificial light mode of operation, wherein the light integrating network is characterized by a relatively low sensitivity in the natural light mode and a relatively high sensitivity in the artificial light mode.

SUMMARY OF THE INVENTION

In accordance with the present invention, an exposure control is provided for a photographic camera apparatus preferably of the type having a fixed focus. The camera additionally is of the type having a pair of scanning type shutter blade elements for respectively blocking and unblocking the passage of light through an effective exposure aperture to a film plane and through an effective photocell aperture to a light sensing photocell. The shutter blades include overlapping exposure apertures and photocell apertures, and are driven by a rotatable member, or walking beam, which is controlled to move between first and second arrangements or angular limit positions. As the walking beam is displaced from its first arrangement, the overlapping exposure and photocell apertures of the shutter blades cooperate to establish effective exposure and photocell apertures respectively which progressively increase as the walking beam is displaced towards its second arrangement.

A spring bias means is adapted to bias the walking beam for movement from its first arrangement toward its second arrangement at the beginning of an exposure cycle. An electromechanical means is configured to return the walking beam to its first arrangement in response to an integrating network which determines a point in time in an exposure cycle at which the integral of the light incident on a light sensor exceeds a predetermined value.

An illumination mode control is provided so that in an artificial light mode, during an exposure cycle, the walking beam may pass fully between its first and second arrangements with the effective exposure aperture progressively increasing toward the full open f/stop. In addition, as the walking beam passes from its first arrangement towards its second arrangement, the effective photocell aperture is increased at a relatively low rate until a time when the effective exposure aperture equals a predetermined f/stop somewhat below the full open f/stop. Thereafter during the exposure cycle, the effective photocell increases at a relatively high rate.

In a natural light mode, a stop member is positioned to interferingly engage with the walking beam at a predetermined intermediate arrangement between the first and second arrangements. During an exposure cycle, both the effective exposure aperture and the effective photocell aperture progressively increase as the walking beam rotates, until the beam interferingly engages the stop member.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
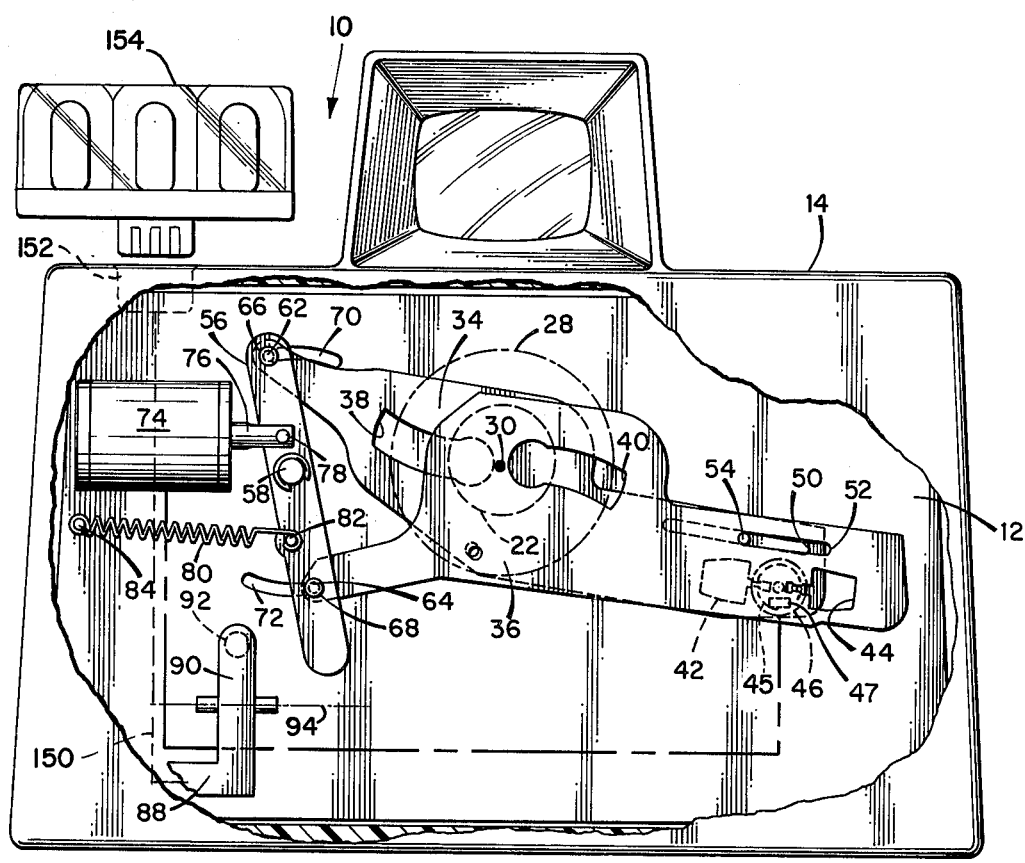
FIG. 1 is a front elevation with portions broken away depicting a photographic camera housing incorporating the exposure control system of this invention.
Figure 2:
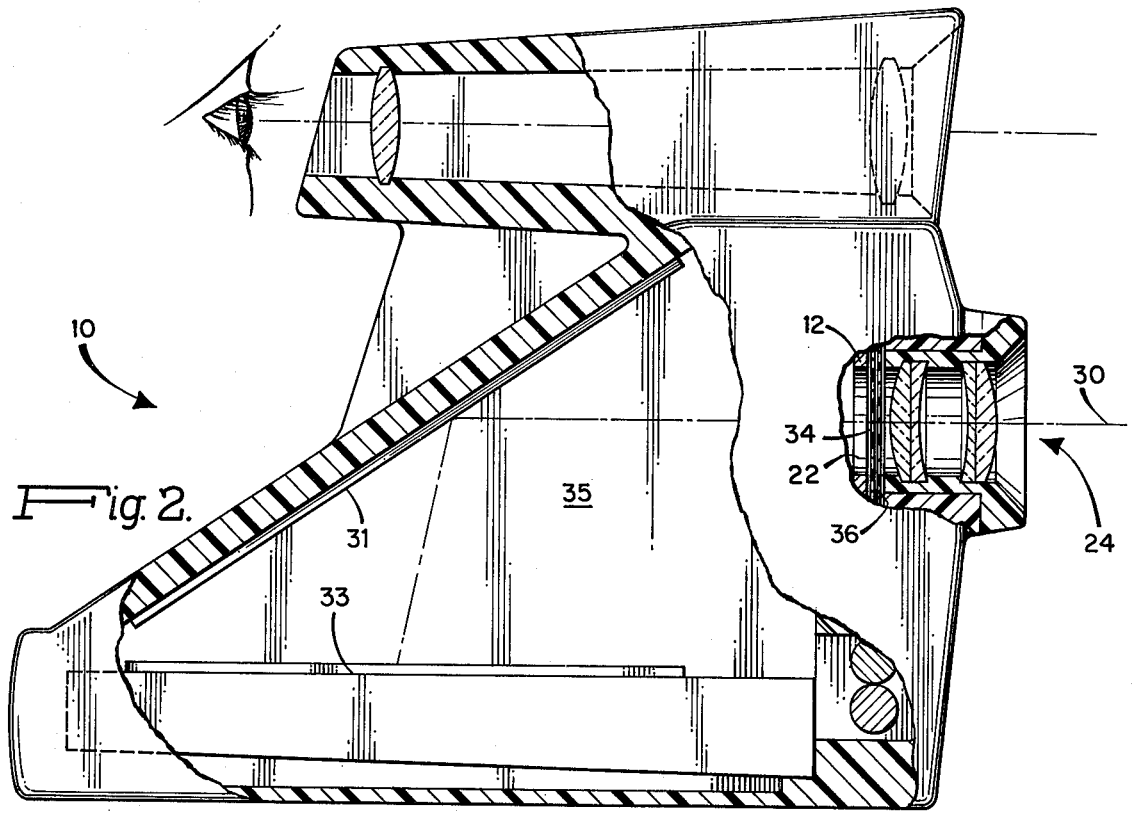
FIG. 2 is a partial cross-sectional view of the camera of FIG. 1.

FIGS. 1 and 2 generally illustrate a camera having a housing 10. An exposure control system in accordance with this invention is disposed within the housing 10 and comprises a rear casting 12, selectively machined to support the components of the control system mechanism. A cover 14 surrounds the front and top of the casting 12 and includes openings for a lens assembly 24 and for a photocell light entry window (not shown). The casting 12 includes a centrally disposed exposure opening 22 along an optical axis 30. A mirror 31 is located behind opening 22 to direct the optical axis 30 to a film plane 33 in an exposure chamber 35. The casting 12 also includes a photocell opening 46 aligned with the photocell light entry window in housing 10. A photocell 45 is disposed behind the photocell opening 46.

The lens assembly 24 may include a multiple element objective lens which is aligned along axis 30 in overlying relationship to the exposure opening 22. The lens may alternatively be of the single element meniscus type. In accordance with this invention, the lens assembly 24 is fixedly arranged in conjunction with the film plane 33 in a preferably fixed focus configuration.

A blade mechanism is defined by a pair of overlapping shutter blade elements 34 and 36 arranged between the exposure opening 22 and the photocell opening 46 and the lens assembly 24 and photocell light entry window, respectively. The blade 34 includes an exposure aperture 38 and a photocell aperture 42 and blade 36 includes an exposure aperture 40 and a photocell aperture 44. As described more fully below, the apertures 38 and 42 of blade 34 and the apertures 40 and 44 of blade 36 cooperatively define a progressive variation of effective primary exposure apertures and secondary photocell apertures as the blades 34 and 36 move with respect to each other along a predetermined path as to be herein described. In alternative configurations, a single blade may be utilized in lieu of the two blades 34 and 36.

Photocell 45 is coupled to an integrating circuit 47 which responds to light incident on the photocell 45 to provide a control signal when the integral of light incident on cell 45 exceeds a predetermined exposure value.

The rear casting 12 further includes a pivot pin 54 extending therefrom and a walking beam 56 for mounting the above described blade mechanism for displacement along its predetermined path. Blades 34 and 36 are arranged with slots 50 and 52, respectively, which are adapted to fit over pin 54 in order to restrain the motion of the blades 34 and 36. The walking beam, 56, is adapted to pivotally mount on a pin 58 and includes pin members 66 and 68 which are in a direction parallel to the pivotal axis of beam 56. The casting 12 includes arcuate slots 70 and 72 centered about the pivotal axis of beam 56 and enclosing pins 66 and 68, respectively, so that the walking beam 56 may only rotate between a first limit (as illustrated in FIG. 1) and a second limit. The pin members 66 and 68 are also pivotally connected to the blades 34 and 36, respectively (through holes 62 and 64 in blade elements 34 and 36, respectively). Consequently, as the walking beam 56 passes in a clockwise direction from its first arrangement (as shown in FIG. 1) to its second arrangement, the blade members move substantially in opposite directions along the guide pin 54 with the apertures 38 and 40 and the apertures 42 and 44 progressively changing from a non-overlapping relationship to an overlapping relationship, both mutually and with respect to openings 22 and 46. When the apertures are non-overlapping, the scene light from lens assembly 24 is precluded from reaching the film plane 33 and when the apertures are overlapping, the scene light is admitted to the film plane.

Drive means include a spring 80 coupled by way of pins 82 and 84 to continuously bias the walking beam 56 from its first arrangement (as shown in FIG. 1) to its second arrangement, i.e., urging blades 34 and 36 into positions defining their largest effective aperture over the exposure opening 22 and photocell opening 46. A electromagnetic device in the form of a solenoid 74 is arranged with a mechanical coupling 76 to a pin 78 on walking beam 56 and is electrically coupled (indicated by the broken line in FIG. 1) to the integrating network 47. In response to the control signal generated by network 45, the solenoid 74 is energized to oppose the bias spring 80 and return the walking beam 56 to its first scene light blocking arrangement.

In operation, following an exposure cycle, the walking beam 56 is latched in its first arrangement in the usual manner by means not shown. To commence an exposure cycle, the walking beam 56 is released from its latched position so that the beam 56 passes from its first arrangement towards its second arrangement thereby moving the blade mechanism along its predetermined path to define a range of progressively increasing sized apertures in the usual manner. At a time when the integrator network 47 indicates that the detected integral of the light incident on photocell 45 exceeds a predetermined value, the solenoid 74 is energized to return the walking beam 56 to its first limit arrangement, thereby terminating the exposure cycle.

A means for limiting displacement of the blade mechanism along its predetermined path are also shown in the configuration of FIGS. 1 and 2. This limiting means includes a control arm 88, an extension member 90 and a stop member 92. The extension arm 90 is pivotally connected about an axis 94 so that the stop member 92 may be adapted for operation in an artificial scene lighted mode wherein stop member 92 has no effect on the travel of walking beam 56, or alternatively, in a natural or ambient scene lighted mode where stop member 92 is adapted to interferingly engage walking beam 56 to provide an intermediate limit so that walking beam 56 may be displaced only between the first arrangement (shown in FIG. 1) and the intermediate arrangement established by stop member 92. In various forms of the invention, the control arm 88 may be adjustably controlled to establish the two positions of stop member 92. For example, the control arm 88 may be directly responsive to an operator performed adjustment, or alternatively, may be coupled with a linkage illustrated in phantom at 150 which is activated by the insertion in an artificial light receiving socket 152 of a terminal from an artificial light source 154 into the receptacle 152 in housing 10. In the latter form, the insertion of the artificial light source controls the stop member 92 to be outside the path of movement of the walking beam 56, while removal of the source controls stop member 92 to enter the path of movement of the walking beam 56.

FIGS. 3A – 3E illustrate the operation of the present invention for the embodiment of FIGS. 1 and 2.

Figure 3:
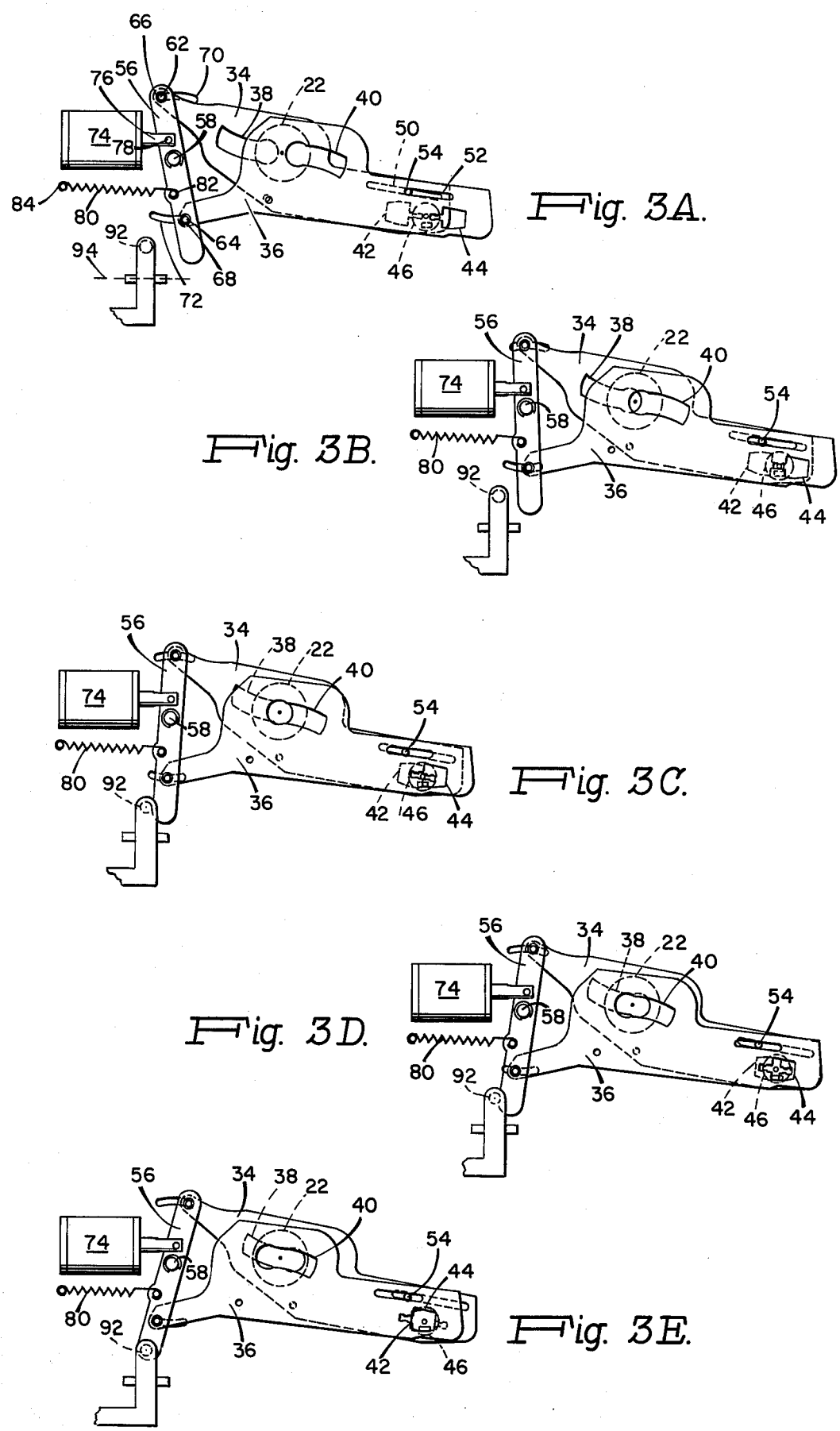
FIGS. 3A - 3E are views diagrammatically depicting the operation of the configuration of FIGS. 1 and 2.

FIGS. 3A – 3E illustrate operation in the artificial scene lighted mode wherein walking beam 56 progressively passes from its first arrangement (FIG. 3A), characterized by no overlap of the exposure and photocell apertures, all the way to its second arrangement (FIG. 3E), characterized by full overlap. In this mode, the stop member 92 of extension arm 90 is positioned so that member 92 has no effect on the displacement of walking beam 56. At the commencement of an exposure cycle, the spring 80 drives the beam 56 in a clockwise rotation. As soon as the light integrating network determines that the integral of light incident on the sensor has reached the predetermined value, the solenoid 74 is energized to return the walking beam 56 to its first arrangement (as shown in FIG. 3A).

FIGS. 3A – 3C illustrate operation in the natural or ambient scene lighted mode wherein the extension member 90 is positioned so that stop member 92 interferingly engages with the walking beam 56 when that beam reaches the intermediate arrangement or limit as illustrated in FIG. 3C. Before beam 56 reaches the intermediate arrangement, the effective exposure aperture as cooperatively defined by the blade exposure apertures 38, 40 progressively increases with the rotation of beam 56. Subsequent to that time, the walking beam 56 remains as shown in FIG. 3C, with constant overlap until the solenoid 74 returns beam 56 to its first scene light blocking arrangement.

Figure 4:
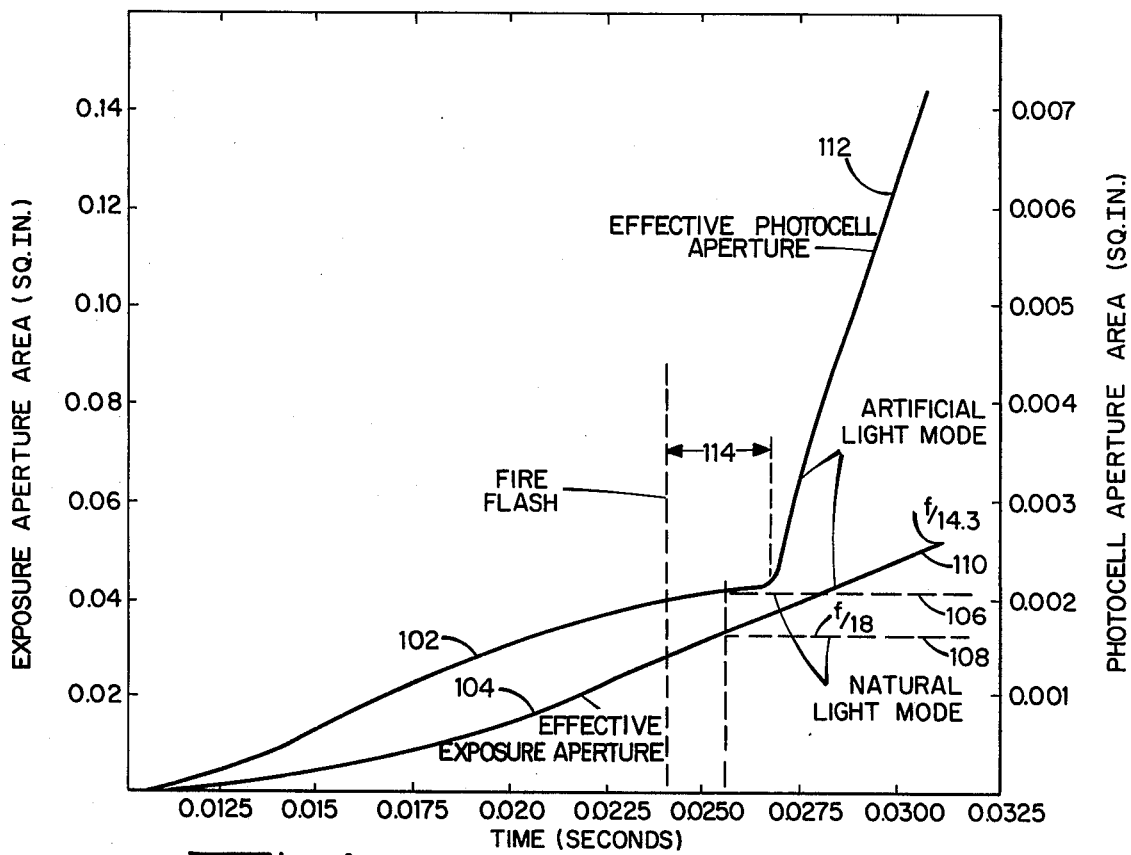
FIG. 4 illustrates the operation of the configuration of FIGS. 1 and 2 in graphical form.

With the above-noted configuration, FIG. 4 illustrates the effective primary exposure and the effective secondary photocell aperture as a function of time for both the ambient scene lighted mode and the artificial scene lighted mode. In the ambient scene lighted mode, both the effective exposure aperture area and the effective photocell aperture area increase generally linearly with time (reference designations 102 and 104, respectively) until the walking beam 56 reaches its intermediate arrangement as limited by the stop member 92. After that time and until the solenoid 74 is energized, both the effective exposure aperture area and effective photocell aperture area are constant (reference designations 106 and 108, respectively), with the effective exposure aperture area being equivalent to f/18 for the illustrated embodiment.

In the artificial scene lighted mode, the effective exposure aperture area increases generally linearly with time to a maximum aperture of f/14.3 (reference designations 104 and 110) as the walking beam 56 passes from its first arrangement to its second scene light unblocking arrangement. In addition, the effective photocell aperture increases approximately linearly with time (reference designation 102) until the effective exposure aperture area is approximately f/18, and then the effective photocell aperture area increases at a relatively rapid rate (reference designation 112) until the walking beam 56 approaches its second arrangement. The rates of change of these effective aperture areas may readily be controlled by selecting appropriate aperture shapes in blades 34 and 36, as well as selecting appropriate spring mechanizations.

Since the depth of field increases in correspondence with a decrease in maximum effective exposure aperture, it becomes readily apparent that the scanning shutter blade arrangement herein described can provide for an increased depth of field at relatively close focal distances where the solenoid 56 is energized to close the blade mechanism prior to the blade mechanism reaching the end of its range of progressively increasing sized apertures. This increased depth of field at relatively short focal distances is of particular advantage in a fixed focus camera.

In the illustrated embodiment, a flash firing signal may be utilized to fire the artificial light source with a suitable advance relative to the instant that the blade mechanism would otherwise have been stopped by the member 92 in order to anticipate the rise time for the light source. In the illustrated embodiment, as indicated by reference designation 114 in FIG. 4, a 3 milisecond advance is used.

With the configurations of the present invention, only a single photocell is required in a camera which is suitable for operation in either an ambient scene lighted mode or an artificially scene lighted mode. In the artificial scene lighted mode, the reflected scene light from the artificial light source exposes the film and simultaneously influences the light integrating (and exposure cut-off) circuit primarily in the range when the blade mechanism moves from its intermediate arrangement (f/18) to its second arrangement (f/14.3). Thus the photocell apertures 42, 44 may be especially configured to control the artificially illuminated portions of the exposure cycle when the effective exposure aperture is in the range between f/18 and f/14.3. As is readily apparent, there may again be provided an increase in the depth of field for the artificially scene lighted mode at the relatively close focal distances for the same reasons as previously discussed relative to the ambient scene lighted mode. In this manner the response of the photocell 45 may be controlled in a substantially different way for the ambient scene lighted mode than for the artificial scene lighted mode using only a single pair of cooperating photocell apertures 42, 44 to define a progressively varying range of effective photocell apertures.

Figure 5A:
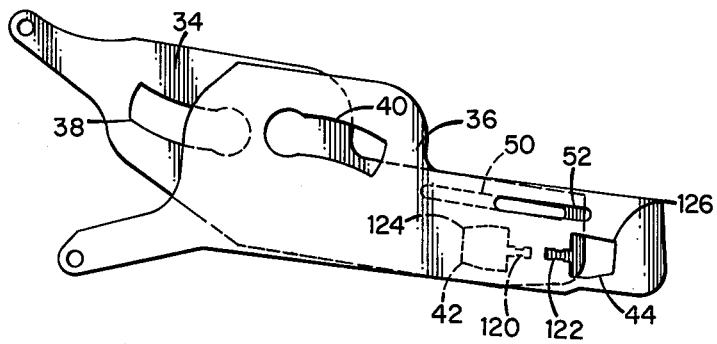
FIG. 5A shows the shutter blades of the camera of FIG. 1.
Figure 5B:
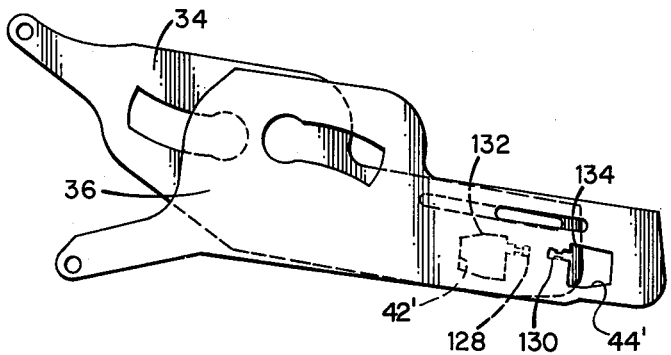
FIG. 5B shows shutter blades for an alternative embodiment of the present invention.

In an alternative embodiment of the present invention, the exposure control for the camera of FIG. 1 may be adapted to change the directional bias of the photocell 45 between its ambient and artificially scene lighted modes of operation. This adaptation may be achieved through the use of shutter blades corresponding to blades 34 and 36, but having differently shaped photocell 45 apertures, in conjunction with a prism positioned over the photocell lens (not shown) in a known manner to provide an upward directional bias to the photocell 45 as is generally desirable in the artificially scene lighted mode of operation. FIG. 5A shows the shutter blade configuration for the FIG. 1 embodiment and FIG. 5B shows the shutter blade configuration for the alternative embodiment. In FIGS. 5A and 5B, corresponding elements are denoted with identical reference designations.

In the camera of FIG. 1 with blades 34 and 36 of the FIG. 5A configuration, both the relatively narrow extension portions 120 and 122 and the realtively wide portions 124 and 126 of the respective photocell apertures 42 and 44 are aligned to symmetrically overlap photocell 45, thereby providing in cooperation with the aforementioned prism an upward bias to the photocell sensitivity.

In contrast, in the camera of FIG. 1 modified to include the photocell prism and the blades 34 and 36 of the FIG. 5B configuration, the relatively narrow extension portions 128 and 130 of the respective photocell apertures 42' and 44' are aligned to overlap photocell 45 above its midpoint while the relatively wide portions 132 and 134 of respective apertures 42' and 44' are aligned to symmetrically overlap photocell 45 at its midpoint. Consequently, during an exposure cycle in the ambient scene lighted mode, (i.e., when the walking beam 56 is moved between its first and intermediate arrangements and only narrow extension portions 128 and 130 overlap the photocell 45), the cooperative effect of the overlap and the prism causes the photocell 45 to be biased downward. During an exposure cycle in the artificial scene lighted mode, where the artificial light flash is triggered to correspond with blade movement from its intermediate arrangement (f/14.3) to its second arrangement (f/18), the wide portions 132 and 134 of the photocell apertures 42', 44' overlap the photocell 45, and cooperate with the aforementioned prism to bias the directional response of the photocell upward. Accordingly, this configuration provides a downward directed exposure weighting in the ambient scene lighted mode which is useful in many photographic applications, for example, where the sky forms the background for a scene. In the artificial scene lighted mode, the system provides upward exposure weighting to accommodate typical flash requirements. In other embodiments, the sensor apertures may be selected to provide alternative exposure weighting.

The invention may be embodied in other specific forms, such as cameras having variable focus objective lenses, without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A photographic camera apparatus for use in either an ambient scene lighted mode or an artificially scene lighted mode wherein the camera includes means for mounting photographic film material at a given focal plane, said camera comprising:
   a blade mechanism;
   means for mounting said blade mechanism for displacement along a predetermined path between a first arrangement wherein it precludes scene light from reaching the film plane and a second arrangement wherein it defines a maximum size aperture, said blade mechanism serving to define a range of progressively increasing sized apertures as it moves from its said first arrangement to its said second arrangement;
   means for detecting scene light in correspondence to the scene light admitted to the focal plane by said blade mechanism as it moves through said range of apertures between said first and second arrangements and for integrating said detected scene light to provide an output signal corresponding to a select exposure value;
   selectively actuable drive means for initially displacing said blade mechanism from its said first arrangement toward its said second arrangement, and in at least one of said modes of operation for thereafter displacing said blade mechanism back toward its said first arrangement in response to said output signal from said scene light detecting and integrating means to define an exposure cycle;
   and means responsive to camera operation in the ambient scene lighted mode for limiting displacement of said blade mechanism along said predetermined path to an intermediate arrangement wherein it defines an aperture size less than said maximum aperture size and responsive to camera operation in the artificially scene lighted mode for not limiting displacement of said blade mechanism along said predetermined path intermediate its said first and second arrangements thereby providing for varying depths of field in at least said one mode of operation.

2. The photographic camera of claim 1 wherein: said blade mechanism includes a pair of overlapping shutter blade elements having respective primary apertures therethrough which cooperatively define said range of progressively increasing sized apertures during blade displacement along said predetermined path, and scene light detecting means includes a pair of overlapping secondary apertures with a photoresponsive element stationed therebehind wherein each of said secondary apertures is spaced apart from a respective primary aperture in a respective shutter blade element, said secondary apertures cooperating to define another range of changing aperture sizes to admit scene light to said photoresponsive element in correspondence with the scene light admitted by said range of apertures defined by said primary apertures as said blade mechanism is displaced along said predetermined path, said other range of changing aperture sizes being specifically configured to accommodate an ambient scene lighted exposure condition when said blade mechanism is displaced between said first and intermediate arrangements and to accommodate an artificially illuminated exposure condition when said blade mechanism is displaced between said intermediate and second arrangements.

3. The photographic camera of claim 2 wherein said specially configured other range of aperture sizes increases at a substantially greater rate when said blade mechanism is displaced from said intermediate arrangement to said second arrangement than when said blade mechanism is displaced from said first arrangement to said intermediate arrangement.

4. The camera of claim 2 wherein said specially configured other range of aperture sizes provides a different influence with respect to the directional response of said photoresponsive element when said blade mechanism is displaced from said intermediate arrangement to said second arrangement than when said blade mechanism is displaced from said first arrangement to said intermediate arrangement.

5. The camera of claim 1 including means for facilitating a releasable connection to a source of artificial illumination including means for accommodating a releasable electrical connection to the source of artificial illumination wherein said limiting means allows said blade mechanism to move to said second arrangement in response to the source of artificial illumination being releasably connected to said connecting means.

6. The photographic camera of claim 1 wherein said objective lens is of the non-variable focus type.

7. A photographic camera apparatus for use in either an ambient scene lighted mode or an artificially scene lighted mode wherein the camera includes means for mounting photographic film material at a given focal plane, said camera comprising:
   a blade mechanism;
   means for mounting said blade mechanism for displacement along a predetermined path between a first arrangement wherein it precludes scene light from reaching the film plane and a second arrangement wherein it defines a maximum size aperture, said blade mechanism serving to define a range of progressively increasing sized apertures as it moves from its said first arrangement to its said second arrangement;
   means for detecting scene light in correspondence to the scene light admitted to the focal plane by said blade mechanism as it moves through said range of apertures between said first and second arrangements and for integrating said detected scene light to provide an output signal corresponding to a select exposure value;
   selectively actuable drive means for initially urging displacement of said blade mechanism from its said first arrangement toward its said second arrangement, and thereafter in response to said output signal from said scene light detecting and integrating means, urging displacement of said blade mechanism back toward its said first arrangement to define an exposure cycle;
   means operative in the ambient scene lighted mode for stopping movement of said blade mechanism as it moves from said first arrangement toward said second arrangement, said blade mechanism being stopped at an intermediate arrangement to define an aperture smaller than said maximum sized aperture, said stopping means allowing said blade mechanism to move from its said first arrangment to its said second arrangement in response to the camera being operated in an artificially scene lighted mode thereby providing for varying depths of field; and
   means for providing a signal effective to fire a source of artificial illumination, said firing signal being provided when said blade mechanism moves from its said first arrangement toward its said second arrangement so that most of the artificial scene illumination admitted to the focal plane is detected and integrated as said blade mechanism moves between its said intermediate and second arrangements.

8. The photographic camera of claim 7 wherein: said blade mechanism includes a pair of overlapping shutter blade elements having respective primary apertures therethrough which cooperatively define said range of progressively increasing sized apertures during blade displacement along said predetermined path, and said scene light detecting means includes a pair of overlapping secondary apertures with a photoresponsive element stationed therebehind wherein each of said secondary apertures is spaced apart from a respective primary aperture in a respective shutter blade element, said secondary apertures cooperating to define another range of changing aperture sizes to admit scene light to said photoresponsive element in correspondence with the scene light admitted by said range of apertures defined by said primary apertures as said blade mechanism is displaced along said predetermined path, said other range of changing aperture sizes being specifically configured to accommodate an ambient scene lighted exposure condition when said blade mechanism is displaced between said first and intermediate arrangements and to accommodate an artificially illuminated exposure condition when said blade mechanism is displaced between said intermediate and second arrangements.

9. The photographic camera of claim 8 wherein said specially configured other range of aperture sizes increases at a substantially greater rate when said blade mechanism is displaced from said intermediate arrangement to said second arrangement than when said blade mechanism is displaced from said first arrangement to said intermediate arrangement.

10. The camera of claim 8 wherein said specially configured other range of aperture sizes provides a different influence with respect to the directional response of said photoresponsive element when said blade mechanism is displaced from said intermediate arrangement to said second arrangement than when said blade mechanism is displaced from said first arrangement to said intermediate arrangement.

11. The camera of claim 7 including means for facilitating a releasable connection to a source of artificial illumination including means for accommodating a releasable electrical connection to the source of artificial illumination wherein said stopping means allows said blade mechanism to move to said second arrangement in response to the source of artificial illumination being releasably connected to said connecting means.

12. The photographic camera of claim 7 wherein said objective lens is of the non-variable focus type.

13. A photographic camera apparatus of the non-variable focus type for use in either an ambient scene lighted mode or an artificially scene lighted mode wherein the camera includes means for mounting photographic film material at a given focal plane, said camera comprising:
   a non-variable focus objective lens;
   a blade mechanism;
   means for mounting said blade mechanism for displacement along a predetermined path between a first arrangement wherein it precludes scene light from reaching the film plane and a second arrangement wherein it defines a maximum size aperture, said blade mechanism serving to define a range of progressively increasing sized apertures as it moves from its said first arrangement to its said second arrangement;

selectively actuable drive means for initially urging displacement of said blade mechanism from its said first arrangement toward its said second arrangement, and thereafter urging displacement of said blade mecahnism from its said second arrangement back toward its said first arrangement to define an exposure cycle;

means operative in the ambient scene lighted mode for intercepting said mounting means at a fixed location along said predetermined path of blade movement to inhibit movement of said blade mechanism at an intermediate arrangement defining an aperture smaller than said maximum sized aperture, said intercepting means moving out of potential intercepting relation with respect to said mounting means so as to allow said blade mechanism to move to its said second arrangement in response to the camera being operated in an artificially scene lighted mode thereby providing for varying depths of field; and means for providing a signal effective to fire a source of artificial illumination in correspondence with said blade mechanism moving from its said first arrangement to its said second arrangement such that most of the artificial scene illumination is admitted to the focal plane while said blade mechanism moves between its said second and intermediate arrangements.

14. The photographic camera of claim 13 including means for detecting scene light in correspondence to the scene light admitted to the focal plane by said blade mechanism as it moves through said range of apertures between said first and second arrangements and for integrating said detected scene light to provide an output signal corresponding to a select exposure value, said output signal being effective to actuate said drive means to urge displacement of said blade mechanism back toward its said first arrangement and wherein: said blade mechanism includes a pair of overlapping shutter blade elements having respective primary apertures therethrough which cooperatively define said range of progressively increasing sized apertures during blade displacement along said predetermined path, and wherein said scene light detecting means includes a pair of overlapping secondary apertures with a photoresponsive element stationed therebehind with each of said secondary apertures being spaced apart from a respective primary aperture in a respective shutter blade element, said secondary apertures cooperating to define another range of changing aperture sizes to admit scene light to said photoresponsive element in correspondence with the scene light admitted by said range of apertures defined by said primary apertures as said blade mechanism is displaced along said predetermined path, said other range of changing aperture sizes being specifically configured to accommodate an ambient scene lighted exposure condition when said blade mechanism is displaced between said first and intermediate arrangements and to accommodate an artificially illuminated exposure condition when said blade mechanism is displaced between said intermediate and second arrangements.

15. The photographic camera of claim 14 wherein said specially configured other range of aperture sizes increases at a substantially greater rate when said blade mechanism is displaced from said intermediate arrangement to said second arrangement than when said blade mechanism is displaced from said first arrangement to said intermediate arrangement.

16. The camera of claim 14 wherein said specially configured other range of aperture sizes provides a different influence with respect to the directional response of said photoresponsive element when said blade mechanism is displaced from said intermediate arrangement to said second arrangement than when said blade mechanism is displaced from said first arrangement to said intermediate arrangement.

17. The camera of claim 13 including means for facilitating a releasable connection to a source of artificial illumination including means for accommodating a releasable electrical connection to the source of artificial illumination wherein said intercepting means moves out of potential intercepting relation with respect to said mounting means in response to the source of artificial illumination being releasably connected to said connecting means.

* * * * *